United States Patent
Imhof

(10) Patent No.: US 12,302,892 B1
(45) Date of Patent: May 20, 2025

(54) ARTIFICIAL BAIT DECOY

(71) Applicant: John Imhof, Pittsburg, KS (US)

(72) Inventor: John Imhof, Pittsburg, KS (US)

(73) Assignee: John Imhof, Pittsburg, KS (US)

( * ) Notice: Subject to any disclaimer, the term of this patent is extended or adjusted under 35 U.S.C. 154(b) by 0 days.

(21) Appl. No.: 18/607,944

(22) Filed: Mar. 18, 2024

(51) Int. Cl.
*A01M 31/06* (2006.01)

(52) U.S. Cl.
CPC .................... *A01M 31/06* (2013.01)

(58) Field of Classification Search
CPC .................................................. A01M 31/06
See application file for complete search history.

(56) References Cited

U.S. PATENT DOCUMENTS

| | | | |
|---|---|---|---|
| 1,259,641 A * | 3/1918 | Livezey ................ | A01M 31/06 43/2 |
| 2,730,828 A * | 1/1956 | Caretti ............... | A01K 39/0106 43/2 |
| 4,607,447 A | 8/1986 | Wright | |
| 11,606,950 B2 | 3/2023 | Jameson | |
| 2004/0060223 A1 | 4/2004 | Mercier | |
| 2005/0000143 A1 | 1/2005 | Smith et al. | |
| 2007/0051029 A1 * | 3/2007 | Ring ..................... | A01M 31/06 43/2 |
| 2009/0107025 A1 | 4/2009 | Bolton | |
| 2018/0070580 A1 * | 3/2018 | Laniewicz ............ | A01M 31/06 |
| 2019/0335743 A1 * | 11/2019 | Payne ................... | A01M 31/06 |
| 2021/0298289 A1 * | 9/2021 | Jameson ............... | A01M 31/06 |

* cited by examiner

*Primary Examiner* — Christopher P Ellis
(74) *Attorney, Agent, or Firm* — Argus Intellectual Enterprise, LLC; Jordan Sworen; Daniel Enea

(57) ABSTRACT

An artificial bait decoy is provided. The artificial bait decoy includes a housing shaped to mimic a corn pile, designed to serve as a visual attractant for deer and turkey. The housing features an opening in which a scented member is disposed, offering a dual attraction mechanism by combining visual mimicry with olfactory stimuli. The scented member contains a scented compound specifically capable of attracting animals, enhancing the effectiveness of the decoy. The housing is non-edible and rigid, wherein a flange extends around the housing's perimeter to allow for placement on various surfaces. Apertures are disposed around the flange to secure the decoy to the ground using stakes. The present invention eliminates the need for real corn, providing a sustainable and effective solution for luring game into close quarters.

18 Claims, 7 Drawing Sheets

ARTIFICIAL BAIT DECOY

BACKGROUND OF THE INVENTION

The present invention relates to decoys. The present invention further provides a decoy designed to mimic a corn pile having a scented member thereby comprising a dual attraction mechanism by combining visual mimicry with olfactory stimuli.

The present invention pertains to devices aimed at attracting wildlife, with a specific focus on an artificial bait decoy that appeals to deer and turkey through visual and olfactory simulation of real corn. Wildlife attraction tools play a crucial role for hunters and naturalists who seek to draw wildlife into proximity for observation or management purposes. Traditionally, the deployment of actual food items, such as corn, has been a common practice for attracting such animals. Despite its effectiveness, this approach carries significant drawbacks, including legal restrictions in various areas that aim to prevent disease transmission among wildlife and reduce animals' reliance on human-provided food sources. Moreover, the recurring need to replenish food supplies incurs continuous material and labor expenses and may attract non-target species or pests, complicating wildlife management efforts.

Recognizing the limitations of current wildlife attraction strategies, there is a clear demand for a method that is both effective and compliant with legal standards, without the associated costs and maintenance challenges of traditional food-based approaches. The invention presented herein introduces an artificial bait decoy that addresses these issues. Notably, this invention not only achieves a high degree of visual and olfactory fidelity to real corn but also boasts a robust, rigid structure that significantly enhances its durability and longevity. This structural resilience ensures that the decoy remains effective over extended periods, even in adverse environmental conditions, thereby offering a sustainable, efficient alternative to both real corn use and existing decoy solutions.

The artificial bait decoy marks a significant advancement in wildlife attraction technology. By delivering a durable, legal, and maintenance-free solution, the artificial bait decoy substantially improves upon the drawbacks of both traditional and contemporary methods. The present invention provides a pivotal shift towards more sustainable and effective wildlife management and observation practices, reflecting a deep understanding of the challenges inherent in attracting deer and turkey and a committed response to overcoming these challenges through innovation.

In light of the devices disclosed in the known art, it is submitted that the present invention substantially diverges in design elements and methods from the known art and consequently it is clear that there is a need in the art for an improvement for an artificial bait decoy. In this regard the instant invention substantially fulfills these needs.

SUMMARY OF THE INVENTION

In view of the foregoing disadvantages inherent in the known types of artificial bait decoys now present in the known art, the present invention provides a new artificial bait decoy wherein the same can be utilized for attracting game animals to desired locations without leaving food at those same locations.

It is an objective of the present invention to provide an embodiment of the artificial bait decoy comprising a housing shaped to mimic a corn pile having an opening and a scented member disposed within the opening, wherein the scented member comprises a scent adapted to attract an animal.

It is another objective of the present invention to provide another embodiment of the artificial bait decoy wherein the scented member is a wax or liquid disposed within a container or scented compartment received by the container.

It is yet another objective of the present invention to provide an embodiment of the artificial bait decoy comprising a flange disposed around a perimeter of the housing configured to rest on a surface, wherein the flange comprises an aperture adapted to receive a stake therethrough for securing the housing to the surface.

It is therefore an object of the present invention to provide a new and improved artificial bait decoy comprising that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purpose of presenting a brief and clear description of the present invention, the preferred embodiment will be discussed as used for providing decoys for attracting wildlife. The figures are intended for representative purposes only and should not be considered to be limiting in any respect.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment", "first embodiment", "second embodiment", or "third embodiment" does not necessarily refer to the same embodiment. Additionally, reference to a "device" can refer to a single guard member or more than one guard members.

Figure 1:
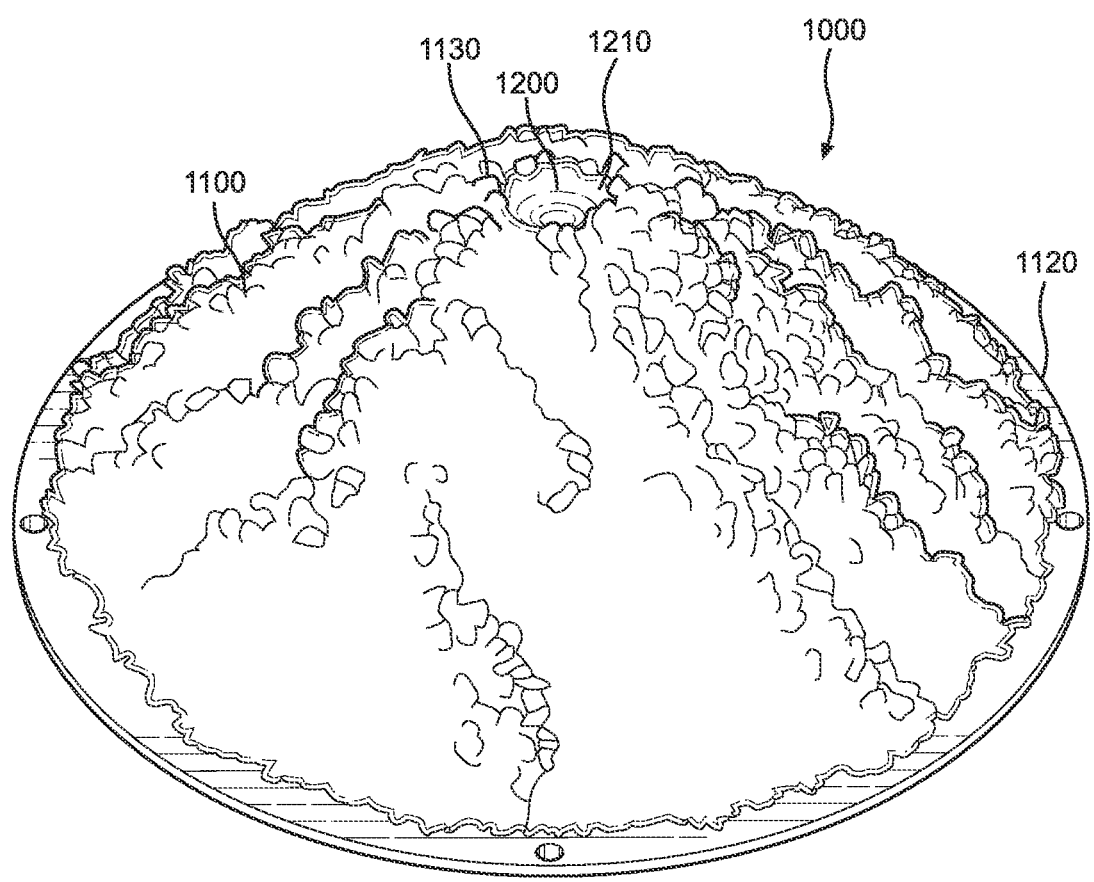
FIG. 1 shows a perspective view of a first embodiment of the artificial bait decoy.

Referring now to FIG. 1, there is shown a perspective view of a first embodiment of the artificial bait decoy. The artificial bait decoy 1000 comprises a housing 1000 shaped to mimic a corn pile. The exterior of the housing 1000 includes small protrusions and recesses arranged in such a manner as to be similar to an exterior of a pile of corn kernels. The housing 1000 forms a dome that rests atop a surface and extends upwards therefrom such that wildlife can see the exterior of the housing 1000. In some embodiments, the artificial bait decoy comprises any suitable shape designed to visually attract wildlife. In the illustrated embodiment, the housing 1100 tapers from a lower end 1120 to an upper end 1130 thereof, such that the lower end comprises a greater width than a width of the upper end.

The housing 1100 comprises an opening 1200 configured to receive a scented member adapted to attract an animal. In the illustrated embodiment, the opening 1200 forms a recess 1210 on the center of the upper surface. The recess 1210 is integral with the housing 1100 and includes a closed lower end. In alternate embodiments, the opening extends through the housing such that the scented member is disposed on an interior volume of the housing. In the illustrated embodiment, the scented member comprises a solid wax insert, whereas in alternate embodiments, the scented member is a liquid poured into the recess. The benefit of the scented member positioned within a recess or interior volume of the housing is to provide concealment of the scented member from an approaching animal and to prevent access of the scented member from the animal. However, it is contemplated in alternate embodiments, that the scented member is disposed on an exterior of the housing. The housing 1000 is non-edible and composed of a rigid material, such as a rigid plastic or thermoplastic material.

Figure 2:
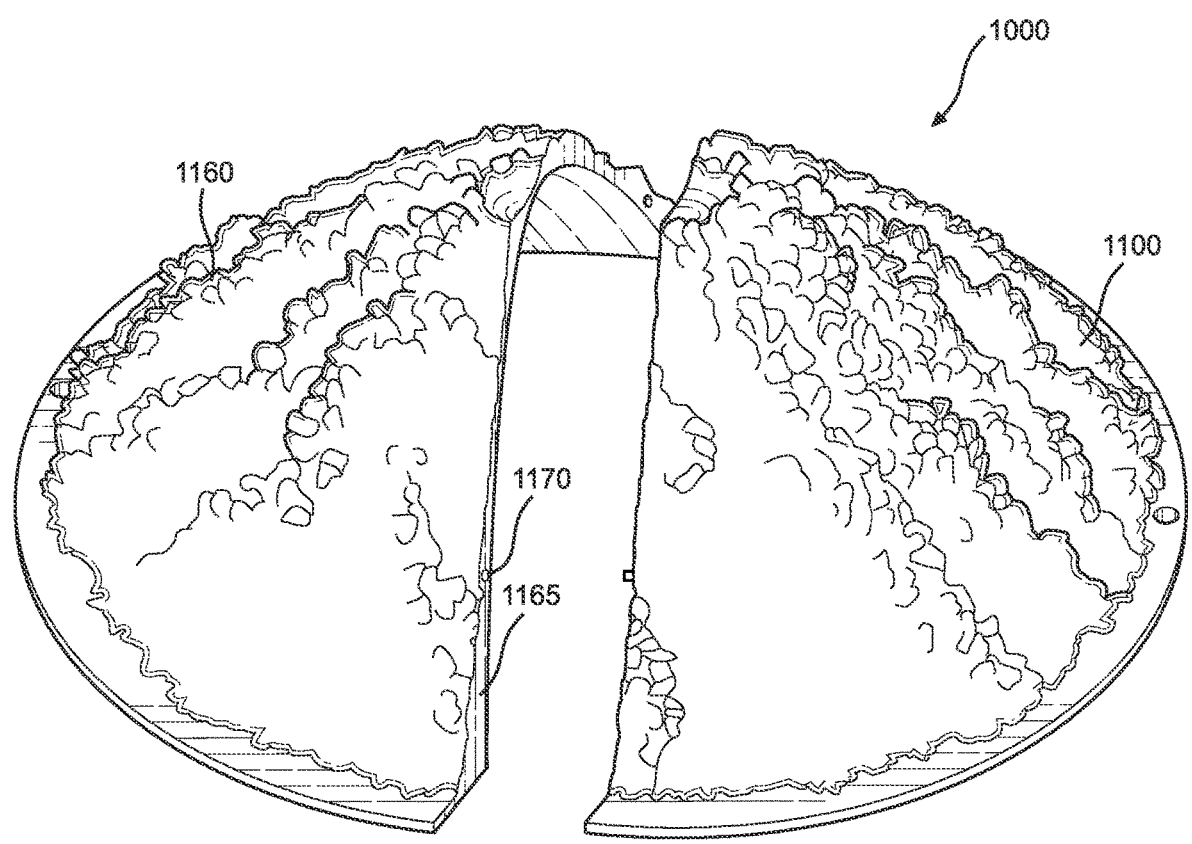
FIG. 2 shows a perspective view of a second embodiment of the artificial bait decoy.

Referring now to FIG. 2, there is shown a perspective view of a second embodiment of the artificial bait decoy. In the illustrated embodiment shown in FIG. 1, the housing 1100 a monolithic structure. In the shown embodiment in FIG. 2, the artificial bait decoy 1000 comprises a pair of sections 1160 configured to secure to one another to form the housing 1100. The pair of sections are substantially equal in shape and size and adapted to secure along a sidewall along a longitudinal axis thereof. In alternate embodiments, the sections are secured to each other along a sidewall extending along a horizontal axis thereof. The pair of sections 1160 comprise mating fasteners 1170 disposed on sidewalls 1165 that allow the sidewalls to rest flush against one another in an assembled configuration. The mating fasteners are a pair of apertures aligned with a pair of protrusions received within the apertures. In alternate embodiments, the mating fastener comprises any suitable fastener, such as a male and female interlocking mechanism, clip, adhesive, overlapping sidewalls adapted to form a friction fit, among other fasteners. In some embodiments, the housing comprises more than two sections configured to fasten together. However, in alternate embodiments, the plurality of sections comprises different sizes and shapes.

Figure 3:
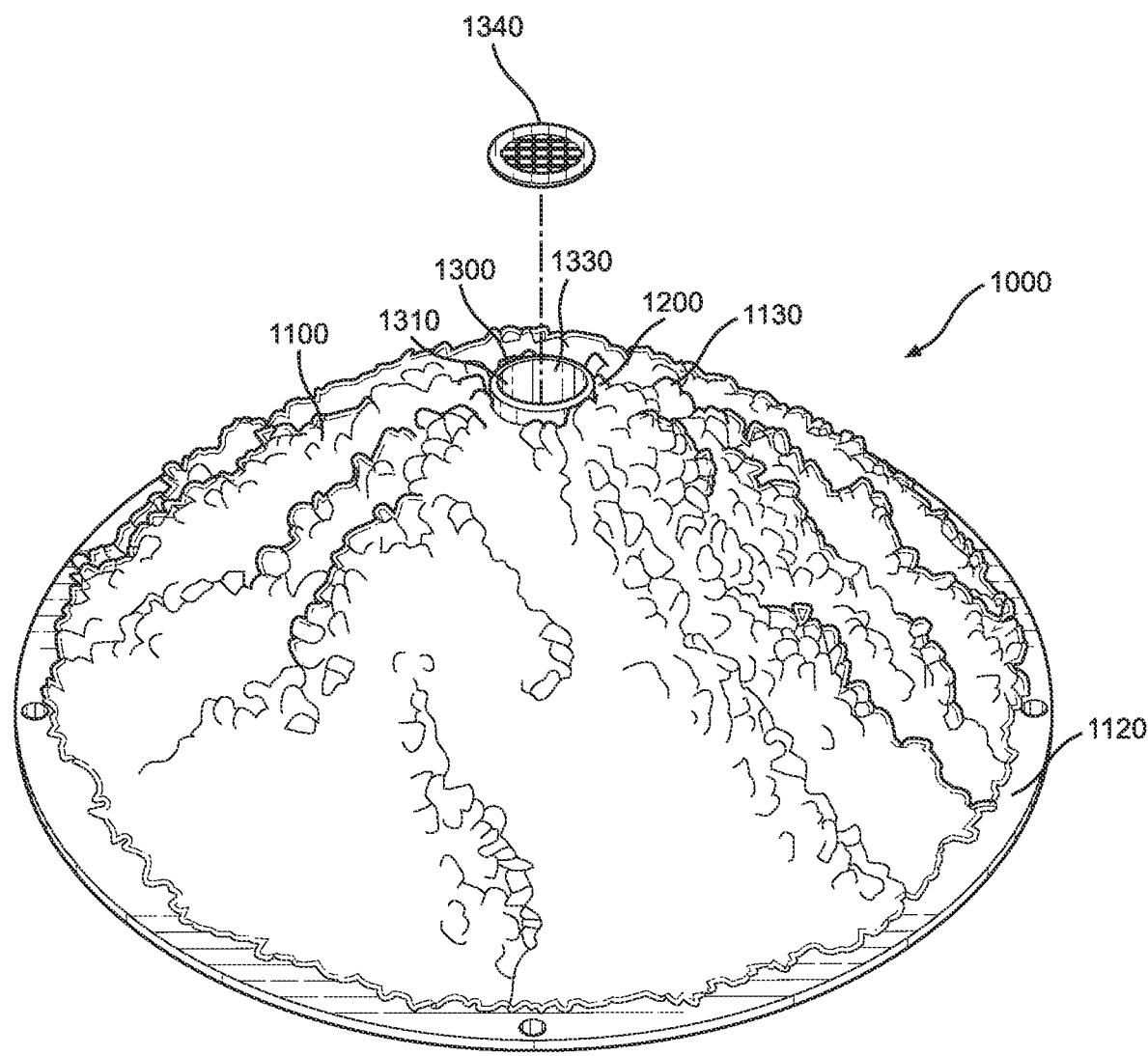
FIG. 3 shows a perspective view of a third embodiment of the artificial bait decoy.
Figure 4:
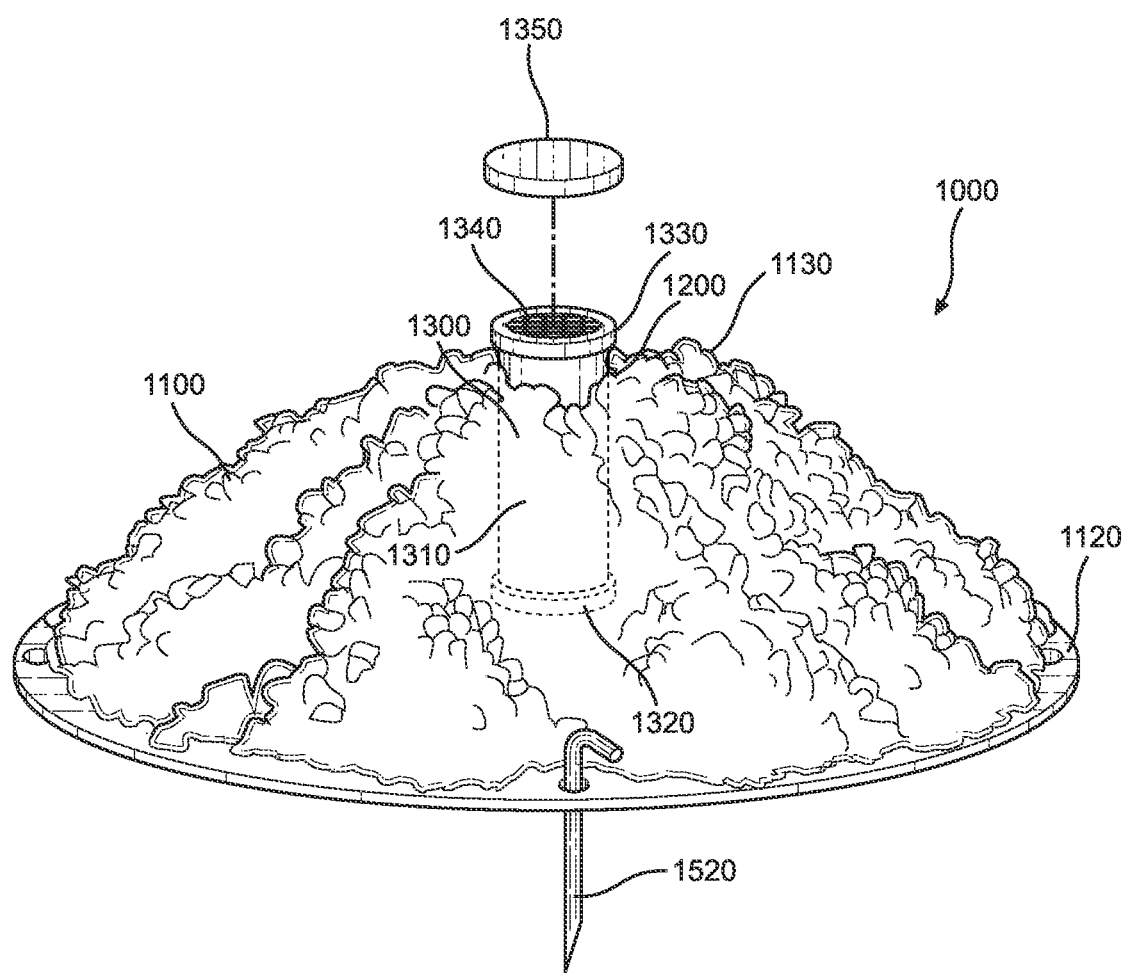
FIG. 4 shows another perspective view of a third embodiment of the artificial bait decoy.
Figure 7:
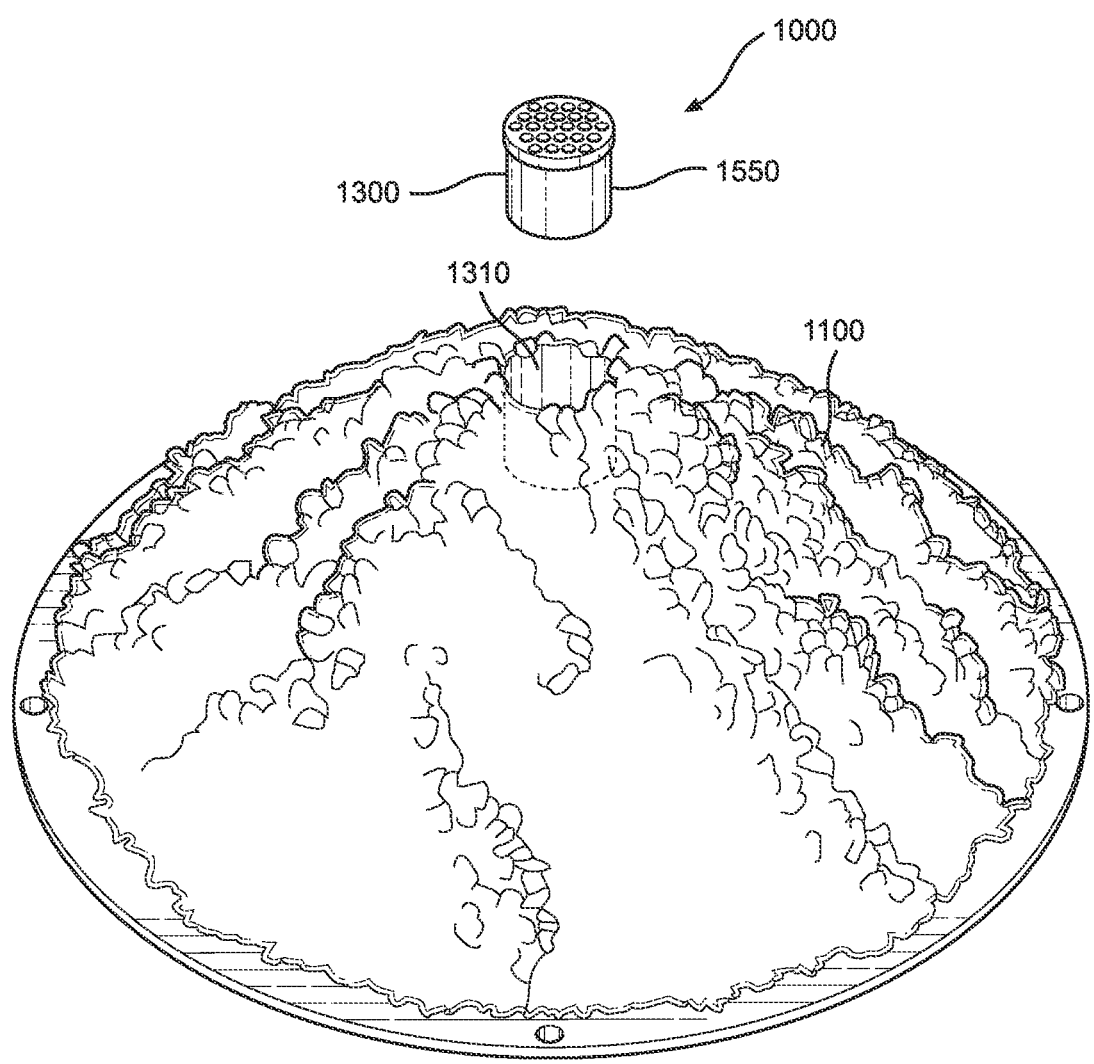
FIG. 7 shows a perspective view of a fourth embodiment of the artificial bait decoy.

Referring now to FIGS. 3 and 4, there are shown perspective views of a third embodiment of the artificial bait decoy. In the illustrated embodiment, the opening 1200 of the artificial bait decoy 1000 provides access to an interior volume and lower side 1120 of the housing 1100. In the shown embodiment, the opening 1200 is configured to removably receive the scented member 1300. In the illustrated embodiment, the housing 1100 comprises a container 1310 having a closed lower end 1320 and an open upper end 1330. In the illustrated embodiment, the container 1310 is cylindrical, however, in alternate embodiments, the container comprises any suitable shape adapted to fit within the interior volume of the housing. In the illustrated embodiment, the upper end of the container 1310 partially extends through the opening 1200, whereas the lower end 1320 is disposed within the interior volume. In alternate embodiments, the entire container is disposed within the interior volume of the housing. In some embodiments, the upper end of the container is level with the opening such the open upper end and the opening lay on a same plane (as seen in FIG. 7). The container 1310 is configured to receive the scented member in the form of an insert, such as a scented wax or liquid either directly therein or contained within a secondary container, as shown in FIG. 7, 1550.

In the illustrated embodiment, the artificial bait decoy 1000 further comprises a guard member 1340 disposed over the open upper end 1330 of the container 1310 to prevent access to an interior volume of the container 1310. The guard member 1340 is shown as a screen to prevent access to the interior. In alternate embodiments, the guard member is any suitable device, such as perforated glass, that is adapted to cover the open upper end of the container to prevent access to the interior thereof while simultaneously allowing the scent to escape the container to the exterior environment. In some embodiments, the artificial bait decoy 1000 comprises a lid 1350 configured to removably cover the open upper end of the container and the guard member 1340. The lid 1350 is adapted to prevent access to the interior volume of the container 1310, as well as prevent any scent disposed within the container from emanating outwards therefrom.

Figure 5:
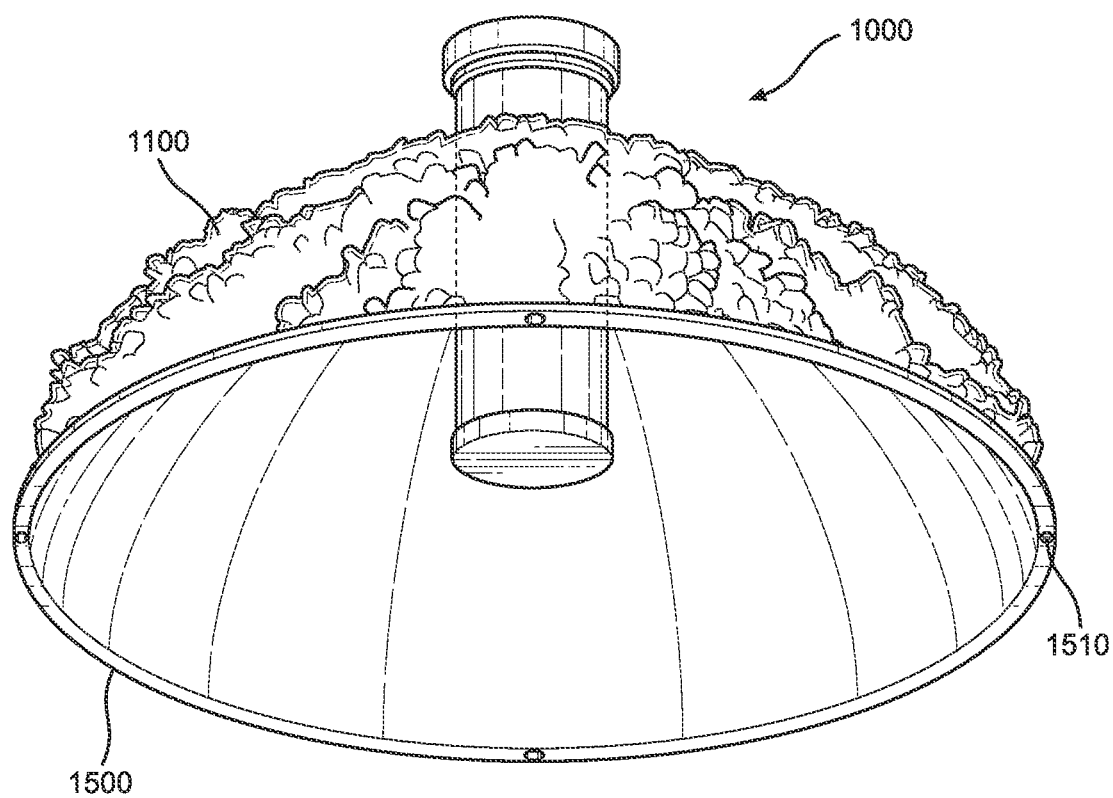
FIG. 5 shows a bottom perspective view of a third embodiment of the artificial bait decoy.
Figure 6:
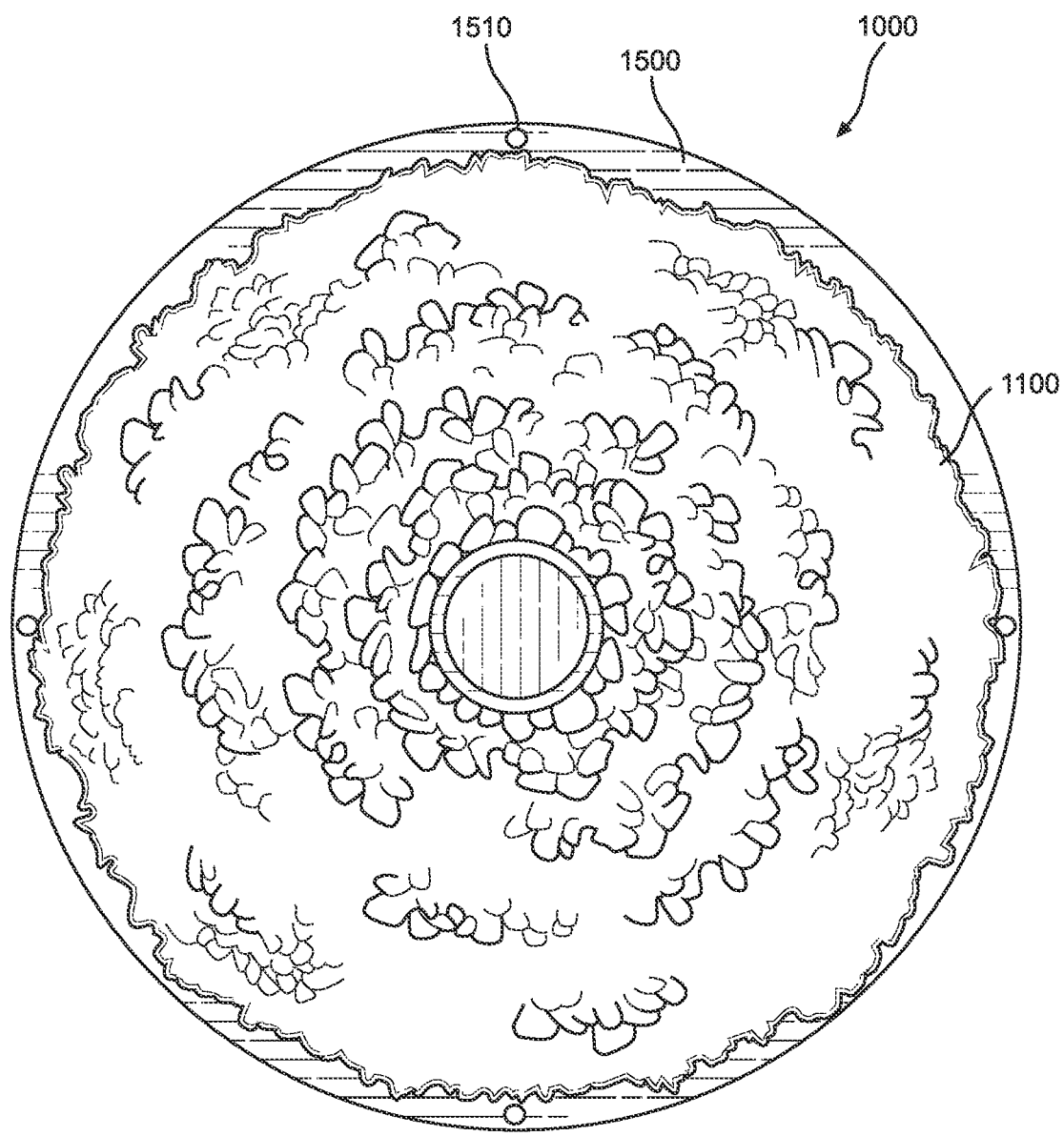
FIG. 6 shows a top planar view of a third embodiment of the artificial bait decoy.

Referring now to FIGS. 5 and 6, there is shown a bottom perspective and a top planar view of a third embodiment of the artificial bait decoy, respectively. In the illustrated embodiment, the artificial bait decoy 1000 comprises a flange 1500 disposed around a perimeter of the housing 1100 configured to rest on a surface. The flange 1500 comprises the greatest width of the artificial bait decoy 1000. A plurality of apertures 1510 extend through the flange 1500 and are each adapted to receive a stake (as seen in FIG. 4, annotation 1520) therethrough for securing the housing 1100 to the surface. The flange 1500 comprises an ellipse shaped cross-section, wherein the apertures are disposed substantially equidistance from one another. However, in alternate embodiments, the flange comprises any suitable shaped cross-section. In some embodiments, the flange does not extend entirely around the perimeter of the housing, but instead forms tabs, each tab configured to receive a stake or other fastener therethrough.

Referring now to FIG. 7, there is shown a perspective view of a fourth embodiment of the artificial bait decoy. In the illustrated embodiment, the artificial bait decoy 1000 comprises a container 1310 having an open upper end 1330, wherein the scented member 1300 is disposed within an scented compartment 1550 having a lid 1350 with a plurality of apertures 1360 to allow the scent to be released while preventing access to an interior of the scented compartment 1550. In the illustrated embodiment, the scented compartment 1550 is configured to secure to the housing via resting on a floor of the container 1310. In alternate embodiments, a lip extends around an exterior perimeter of the upper end and rests on the perimeter of the opening of the housing. In some embodiments, a handle extends from an upper end of the scented compartment to allow a user to easily insert and remove it from the housing.

In some embodiments, a diffusor is operably connected to the housing and configured to disperse the scented compound into the air. In some embodiments, the diffusor is a heated element adapted to heat the scented member. In alternate embodiments, the diffusor is a fan designed to disperse the scented compound in a specific direction.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, device and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An artificial bait decoy, comprising:
    a housing shaped to mimic a corn pile having an opening;
    a scented member disposed within the opening, wherein the scented member comprises a scented compound adapted to attract an animal.
2. The artificial bait decoy of claim 1, wherein the opening is disposed centrally on an upper side of the housing.
3. The artificial bait decoy of claim 1, wherein the housing is rigid.
4. The artificial bait decoy of claim 1, wherein the housing is monolithic.
5. The artificial bait decoy of claim 1, wherein the housing is non-edible.
6. The artificial bait decoy of claim 1, wherein the housing is composed of a plurality of sections configured to fastener together.
7. The artificial bait decoy of claim 1, a flange disposed around a perimeter of the housing configured to rest on a surface.
8. The artificial bait decoy of claim 7, wherein the flange comprises an aperture adapted to receive a stake therethrough for securing the housing to the surface.
9. The artificial bait decoy of claim 8, wherein the flange comprises an ellipse shaped cross-section.
10. The artificial bait decoy of claim 1, wherein an interior of the housing is hollow and comprises an open lower end.
11. The artificial bait decoy of claim 1, further comprising a recess in the opening of the housing, wherein the recess contains the scented member.
12. The artificial bait decoy of claim 1, wherein the housing tapers from a lower end to an upper end thereof, wherein the lower end comprises a greater width than a width of the upper end.
13. The artificial bait decoy of claim 1, wherein the opening is adapted to provide access to an interior volume and lower side of the housing.
14. The artificial bait decoy of claim 1, further comprising a container having a closed lower end and an open upper end disposed within the housing, wherein the open upper end is accessible through the opening, the container adapted to receive the scented member.
15. The artificial bait decoy of claim 14, further comprising a guard member disposed over the upper end of the container to prevent access to an interior volume of the container.
16. The artificial bait decoy of claim 15, further comprising a lid configured to removably cover the open upper end of the container.
17. The artificial bait decoy of claim 1, wherein the scented member comprises scented wax.
18. The artificial bait decoy of claim 14, further comprising a scented compartment removably securable within the container, wherein the scented member is disposed within the scented compartment.

* * * * *